United States Patent
Elias et al.

(10) Patent No.: US 10,579,497 B2
(45) Date of Patent: Mar. 3, 2020

(54) PROVIDING CONTEXT SIMULATION

(71) Applicant: Red Hat, Inc., Raleigh, NC (US)

(72) Inventors: Filip Elias, Vysni Lhoty (CZ); Filip Nguyen, Brno (CZ)

(73) Assignee: Red Hat, Inc., Raleigh, NC (US)

( * ) Notice: Subject to any disclaimer, the term of this patent is extended or adjusted under 35 U.S.C. 154(b) by 336 days.

(21) Appl. No.: 13/777,414

(22) Filed: Feb. 26, 2013

(65) Prior Publication Data

US 2014/0245270 A1 Aug. 28, 2014

(51) Int. Cl.
*G06F 9/44* (2018.01)
*G06F 11/36* (2006.01)

(52) U.S. Cl.
CPC .................. *G06F 11/362* (2013.01)

(58) Field of Classification Search
CPC ..... G06F 11/323; G06F 8/34; G06F 2201/865
See application file for complete search history.

(56) References Cited

U.S. PATENT DOCUMENTS

| | | | | |
|---|---|---|---|---|
| 6,901,581 B1 * | 5/2005 | Schneider | ...................... | 717/124 |
| 7,464,373 B1 * | 12/2008 | Yunt | .......................... | G06F 8/10 717/125 |
| 7,685,412 B1 * | 3/2010 | Burdick | .............. | G06F 9/44505 713/1 |
| 7,784,031 B1 * | 8/2010 | Borg et al. | ..................... | 717/121 |
| 7,958,486 B2 * | 6/2011 | Tsyganskiy | ............... | G06F 8/72 715/713 |
| 8,170,859 B1 * | 5/2012 | Christensson et al. | ......... | 703/22 |
| 8,495,572 B2 * | 7/2013 | Bernin | ...................... | G06F 8/71 717/122 |
| 8,719,791 B1 * | 5/2014 | MacPherson | ......... | G06F 9/4486 717/124 |
| 8,719,797 B2 * | 5/2014 | Revinskaya | ........ | G06F 11/3636 714/35 |
| 9,176,797 B1 * | 11/2015 | Glenn | .................. | G06F 11/3414 |
| 9,448,769 B1 * | 9/2016 | Katoch | ..................... | G06F 8/30 |
| 2002/0004824 A1 * | 1/2002 | Cuan | .................. | G06F 17/3089 709/208 |
| 2004/0010778 A1 * | 1/2004 | Kaler | ...................... | G06F 9/546 717/130 |
| 2004/0044987 A1 * | 3/2004 | Kompalli | .................. | G06F 8/20 717/100 |
| 2004/0088602 A1 * | 5/2004 | Cohen | ................. | G06F 11/3688 714/38.1 |
| 2004/0111708 A1 * | 6/2004 | Calder | ................ | G06F 11/3447 717/131 |
| 2004/0221270 A1 * | 11/2004 | Witchel | .................... | G06F 8/71 717/124 |

(Continued)

*Primary Examiner* — Lewis A Bullock, Jr.
*Assistant Examiner* — Tina Huynh
(74) *Attorney, Agent, or Firm* — Lowenstein Sandler LLP

(57) ABSTRACT

A mechanism for providing context simulation. A method includes receiving context relay from a client machine. The context relay includes context input set (CIS) and configuration difference (diff) data. The method also includes applying the diff data to an application so that configuration settings of the application are same as the configuration settings of a first application on the client machine. The method also includes retrieving message information from the CIS and sending the message information to the application. The method further includes executing the application in same interval as the first application being executed on the client machine.

14 Claims, 5 Drawing Sheets

(56) References Cited

U.S. PATENT DOCUMENTS

| | | | |
|---|---|---|---|
| 2005/0028143 A1* | 2/2005 | Aridor | G06F 8/71 717/122 |
| 2005/0138605 A1* | 6/2005 | Yamamoto | 717/135 |
| 2005/0144619 A1* | 6/2005 | Newman | G06F 8/61 717/177 |
| 2006/0010434 A1* | 1/2006 | Herzog | G06F 9/44505 717/168 |
| 2006/0058619 A1* | 3/2006 | DeYoe et al. | 600/407 |
| 2006/0074949 A1* | 4/2006 | Haruna et al. | 707/100 |
| 2006/0161895 A1* | 7/2006 | Speeter | G06F 8/71 717/121 |
| 2006/0195725 A1* | 8/2006 | Shah | G06F 11/3414 714/47.3 |
| 2006/0294158 A1* | 12/2006 | Tsyganskiy | G06F 8/72 |
| 2007/0038895 A1* | 2/2007 | Biegert | G06F 11/3409 714/47.1 |
| 2007/0143379 A1* | 6/2007 | i Dalfo | G06F 8/61 |
| 2008/0097960 A1* | 4/2008 | Dias | G06F 17/30286 |
| 2008/0127084 A1* | 5/2008 | Sattler | G06F 8/60 717/121 |
| 2008/0162107 A1* | 7/2008 | Aniszczyk | G06F 8/61 703/21 |
| 2008/0235611 A1* | 9/2008 | Fraley | G06F 9/44505 715/772 |
| 2009/0024992 A1* | 1/2009 | Kulaga | G06F 9/44505 717/177 |
| 2010/0013084 A1* | 1/2010 | Medeiros, III | H01L 23/055 257/693 |
| 2010/0082518 A1* | 4/2010 | Gaffga | G06Q 10/00 706/47 |
| 2010/0153443 A1* | 6/2010 | Gaffga | G06Q 10/06 707/770 |
| 2010/0198799 A1* | 8/2010 | Krishnan et al. | 707/702 |
| 2010/0257513 A1* | 10/2010 | Thirumalai | G06F 17/30371 717/134 |
| 2010/0299654 A1* | 11/2010 | Vaswani | G06F 11/366 717/128 |
| 2011/0131549 A1* | 6/2011 | Bozak | G06F 8/71 717/121 |
| 2011/0145789 A1* | 6/2011 | Rasch | G06F 9/44505 717/121 |
| 2012/0159420 A1* | 6/2012 | Yassin et al. | 717/101 |
| 2013/0007693 A1* | 1/2013 | Bliss | G06F 8/63 717/101 |
| 2014/0006358 A1* | 1/2014 | Wang | G06F 17/30289 707/687 |
| 2014/0137080 A1* | 5/2014 | Huang | G06F 9/44505 717/121 |
| 2014/0380280 A1* | 12/2014 | Millwood | G06F 11/366 717/127 |
| 2016/0062765 A1* | 3/2016 | Ji | G06F 8/75 717/122 |

* cited by examiner

PROVIDING CONTEXT SIMULATION

TECHNICAL FIELD

The embodiments of the disclosure relate generally to a computer system and, more specifically, relate to systems and methods for providing context simulation.

BACKGROUND

When a user works on a computing device, the user may confront a bug in a software suite. A bug is an error or a failure in a computer program or system that produces an incorrect or unexpected result, or causes it to behave in unintended ways. A developer usually reproduces the bug for purposes of testing and correction (i.e., debugging). However, this bug reproduction is generally not an accurate representation of the bug. In addition, the reproduction of the bug may be time consuming and entail use of additional resources, which may not be easily available to the developer.

Currently, many techniques exist that identify a bug and attempt to debug it. One known technique is an auditing system, which audits codes in a testing process to prevent any software bugs across multiple processors. If a bug is found, the auditing system retrieves context of the data in the code and removes or replaces the code if a bug is found. Another known technique is thread dump, which takes a snapshot of the state of all the threads (application processes) at a single point in time. This captured state may include content of the threads that reveals information about thread activity of an application, where this thread activity may help in identifying the bugs in the application.

BRIEF DESCRIPTION OF THE DRAWINGS

The disclosure is understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
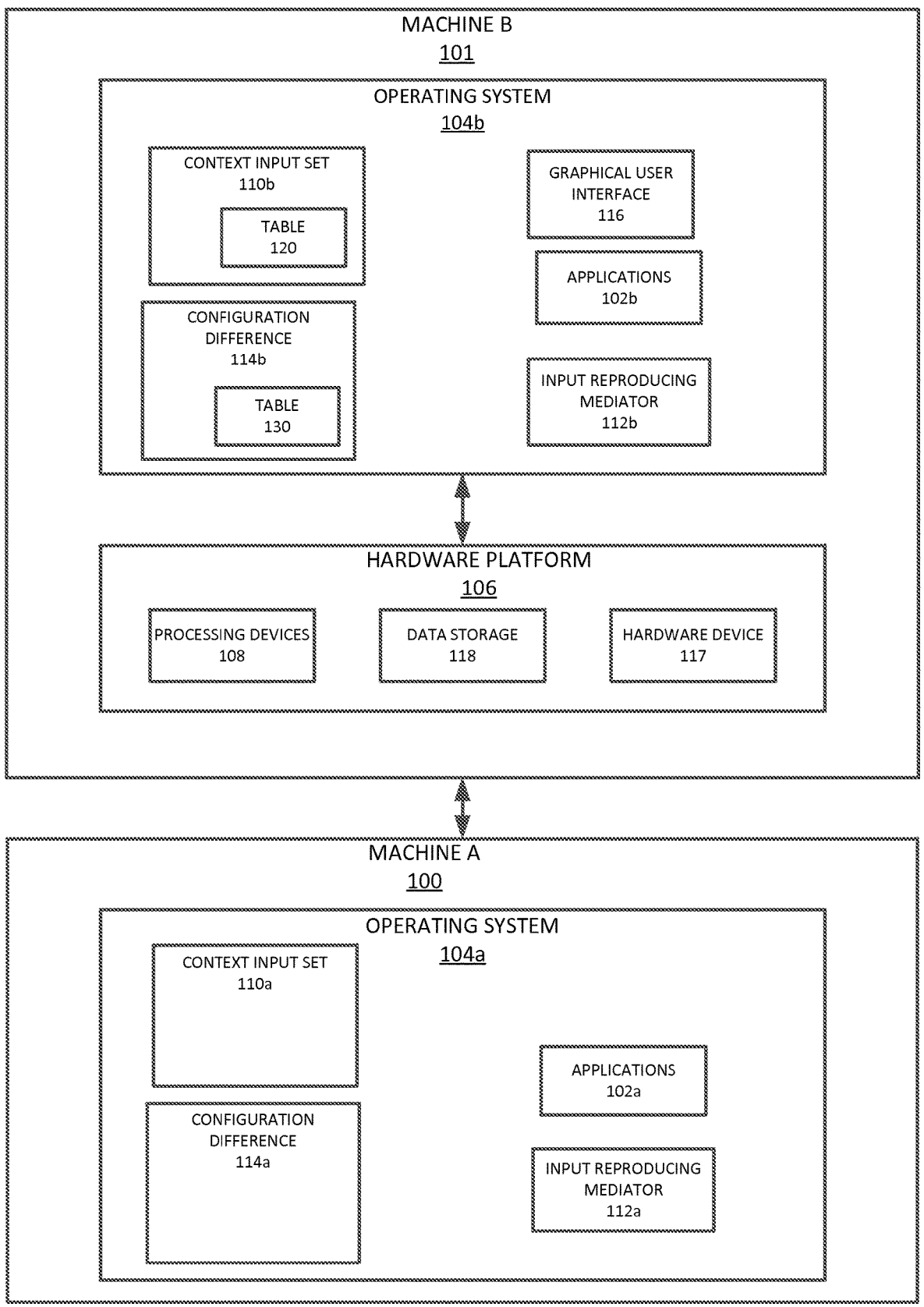
FIG. 1 is a block diagram of a computer system in which the embodiments of the present disclosure may operate.

Embodiments of the disclosure are directed to a method and system for providing context simulation in a computer system. Embodiments of the disclosure function to synchronize context of data and simulate environment, i.e. actual state of the application, including a bug in a developer's environment. A bug is an error or a failure in a computer program or system that produces an incorrect or unexpected result, or causes it to behave in unintended ways. Embodiments of the disclosure also function to simulate the context in real time such that all events occur in same intervals as they occurred at a customer system. In some embodiments, context simulation is applied to simulate the bug in the computer system.

In one embodiment, the application may include a bug. As discussed above, bug is an error or a failure in a computer program or system that produces an incorrect or unexpected result, or causes it to behave in unintended ways. Based on the above-described embodiments of the disclosure, IRM module 112 may then simulate the bug. In one embodiment, means to expose the bug is sent to a developer, who is then able to simulate the bug. The OS 104 may also include a graphical user interface (GUI) 116 configured to provide an interface for the context simulation.

In one embodiment, an input reproducing mediator (a.k.a. client IRM) of an operating system (client OS) of a client machine collects context input set including message information, which is stored in a context input set (CIS) of the (OS) of the computer system. The message information includes, but is not limited to, a type of message, an originator of the message, a delivery time of the message, and data of the message. In some embodiments, message is any communication generated on the OS of the client machine. In other embodiments, the message is any communication received by the OS of the client machine. The client IRM may determine a difference in configuration between a default configuration of the application and actual configuration of the application that runs on the client OS. In one embodiment, the default application configuration is configuration of the application when the client machine receives it from a supplier machine. In one embodiment, the actual application configuration is a configuration of the application customized to suit the client's requirement.

In one embodiment, an IRM (a.k.a. supplier IRM) of the supplier machine applies the difference in the operating system (ask. Supplier OS) of the supplier machine so that the supplier OS of the supplier machine functions according to the configuration of the client OS of the client machine. In one embodiment, the application at the supplier machine is executed and message information from the CIS is sent to the application in the same intervals as they occurred at the customer machine. As such, the supplier IRM simulates the client environment, i.e. actual state of the application in the client machine, including a state of the client's environment. In one embodiment, the supplier IRM simulates the state of the client's environment upon occurrence of the bug.

A method of one embodiment of the disclosure includes receiving context relay from a client machine. The context relay includes context input set (CIS) and configuration difference (diff) data. The method also includes applying the diff data to an application so that configuration settings of the application are same as the configuration settings of a first application on the client machine. The method also includes retrieving message information from the CIS and sending the message information to the application. The method further includes executing the application in same interval as the first application being executed on the client machine.

Prior solutions for simulating a bug presented a variety of disadvantages. For example, an auditing system solution collects context of the data, but does not function to simulate a bug in a developer's environment. Also, a thread dump solution relies solely on data at a single point in time and does not monitor the data in a time context. Furthermore, the thread dump does not function to simulate the bug in the developer's environment. Embodiments of the disclosure overcome these disadvantages by synchronizing context of data in client's environment and simulate the environment, i.e. actual state of the application, including a state of the client's environment upon occurrence of a bug.

FIG. 1 is a block diagram illustrating a machine A 100 and a machine B 101 in which embodiments of the present invention may be implemented.

In one embodiment, the machine A 100 is a client. The machine A (a.k.a. client machine 100) may be any type of computing device including a personal computer (PC) a laptop computer, a handheld computer, a netbook, a desktop, a workstation, a server device, a mainframe, or any other similar computing device. Furthermore, the client machine 100 may comprise a server device.

In one embodiment, the client machine 100 comprises an operating system (OS), 104a. The OS 104a (a.k.a. client OS 104a) may include Microsoft Interfaces™ Linux™, Solaris™, Mac™ OS or any other suitable OS for managing operations on the client machine 100. The OS 104a may include one or more software application programs 102a (i.e. applications). The applications 102a may be any computer-executable program capable of communicating with the OS 104a. Some of these applications may include, but are not limited to Enterprise applications, applications servers, client applications and/or other applications.

In one embodiment, the machine B 101 is a supplier. The machine B (a.k.a. supplier machine 101) may be any type of any type of computing device such as, for example, any variety of end user devices, such as a personal computer (PC), a laptop, a mobile phone, mobile smart phone, a tablet computer, handheld devices, netbooks, or any other computing device. Furthermore, supplier machine 101 may comprise a server device.

The supplier machine 101 comprises a hardware platform 106, on top of which runs an operating system (OS) 104b. The OS 104b may include Microsoft Interfaces™, Linux™, Solaris™, Mac™ OS or any other suitable OS for managing operations on the machine B 100. In one embodiment, the machine B is a supplier.

The hardware platform 106 may include one or more central processing units (CPUs) 108 and data storage 118. In one embodiment, the data storage 118 comprises one or more hardware and software devices, which may be located internally and/or externally to the computer system 100. Examples of data storage 118 may include, but are not limited to, random-access memory (RAM), non-volatile storage memory (e.g., Flash, EEPROM, solid state drives (SSD), etc.), magnetic storage memory (e.g., one or more hard drives), and optical memory (e.g., CDs, DVD, Blue Ray drives, etc.). In addition, hardware platform 106 may include additional hardware devices 117, such as network interface cards (NICs), sound or video adaptors, photo/video cameras, printer devices, keyboards, displays or any other suitable device intended to be coupled to a computer system.

In some embodiments, the client machine 100 may communicate with the supplier machine 101 via the additional hardware devices 117. In some embodiments, the client machine 100 may communicate with the supplier machine 101 via a network.

In one embodiment, the supplier machine 101 comprises an operating system (OS), 104b. The OS 104b (a.k.a. supplier OS 104b) may include Microsoft Interfaces™, Linux™, Solaris™, Mac™ OS or any other suitable OS for managing operations on the client machine 100. The supplier OS 104b may include one or more software application programs 102b (i.e. applications). The applications 102b may be any computer-executable program capable of communicating with the supplier OS 104b. Some of these applications may include, but are not limited to Enterprise applications, applications servers, client applications and/or other applications.

In one embodiment, the client OS 104a includes an input reproducing mediator (IRM) 112a to execute context collection in the computer system. In one embodiment, context collection includes a context input set (CIS) 110a and configuration difference (Diff) 114a in the client OS 104a.

In one embodiment, the IRM 112a provides context input set to be stored in the CIS 110a. The context input set includes message information, which may include, but is not limited to, a type of message, an originator of the message, delivery time of the message and data of the message. In one embodiment, a message is any communication generated on client OS 104a. In one embodiment, the message is any communication received by the client OS 104a. Examples of messages include, but are not limited to, file operations, database communication, remote method invocations, Java™ naming and directory interface lookups, HyperText Transfer Protocol (HTTP) communication, and Java™ virtual machine (JVM) stack communications.

In some embodiments, the IRM module 112a determines the delivery time of the message. In one embodiment, the IRM module 112a includes a clock. The clock may be in the client OS 104a. The IRM module 112a may use the clock to determine and store the time when the message was delivered to the client OS 104a. The delivery time of the message may be a time when the message is generated on the client OS 104a.

In one embodiment, the IRM module 112a provides diff data to be stored in the Diff 114a. The diff data may include difference between default configuration of the application (default application configuration) and actual configuration of the application (actual application configuration) that runs on the client OS 104a. Configuration is a set of characteristics defined to set up or customize a computer program with one or more commands to execute for a particular application. The characteristics may be accessed by the computer programs to determine any updates and/or changes in the configuration file. Some examples of configurations include, but are not limited to, IP addresses, connection ports, security authentication, filenames, and so on. In one embodiment, the default application configuration is configuration of the application when the client machine 100 receives it from the supplier machine 101. In one embodiment, the actual application configuration is a configuration of the application customized to suit the client machine 100.

In some embodiments, the diff data maintained by the Diff 114a is combined with the context input set stored in the CIS 110a to form a context relay. In one embodiment, the IRM 112a of the client machine 100 sends the context relay to the supplier machine 101.

In one embodiment, the context relay from the client OS 104a of the client machine 100 to supplier OS 104a of the supplier machine 101.

The supplier OS 104b may further include an input reproducing mediator (IRM) module 112b to provide context simulation in the computer system. In one embodiment, context simulation is simulation of state and events that occur at the client machine 101.

In one embodiment, the IRM module 112b receives the context relay and applies in the supplier OS 104b in order to function in the context simulation mode. As discussed above, context relay is diff data maintained by the configuration difference (Diff) 114a combined with the context input set including message information stored in the CIS 110a in the client machine 100.

In one embodiment, the IRM module 112b collects the context input set including the message information and stores it in the CIS 110b of the supplier machine 101. In one embodiment, the CIS 110 b includes a table 120 to provide a list of message information, such as the message information described above.

In one embodiment, the IRM module 112b collects the diff data and stores it in the Diff 114b of the supplier machine 101. In one embodiment, the Diff 114b includes a table 130 to maintain a list of the configuration files and their respective changes. In some embodiments, the IRM module 112b searches and retrieves the diff data stored in the Diff 114b. In one embodiment, the IRM module 112b applies the diff data in the Diff 114b into the application 102b in the OS 104b in order for the application 102b in the OS 104b of the supplier machine 101 to have a configuration similar to the application 102a in the OS 104a of the client machine 100. In one embodiment, the IRM module 112b updates the configuration files of the application 102b in the supplier OS 104b.

In one embodiment, the IRM module 112b executes the application 102b on the supplier 104b at the supplier machine 101 and sends the messages from the CIS 110b to the application 102b in the same intervals as the applications are being executed at the client machine 100. As such, the IRM module 112b simulates environment of the client machine 100 in real-time at the OS 104b so that the message information is sent with identical timing as experienced at the client machine 100. As discussed above, real time is such that all events occur in the OS 104b in same intervals as they occurred in the OS 104a of the client machine 100.

In one embodiment, the application 102a in the client machine 100 includes a bug. As such, the IRM module 112b simulates the bug in the client machine 100 in real time.

Figure 2:
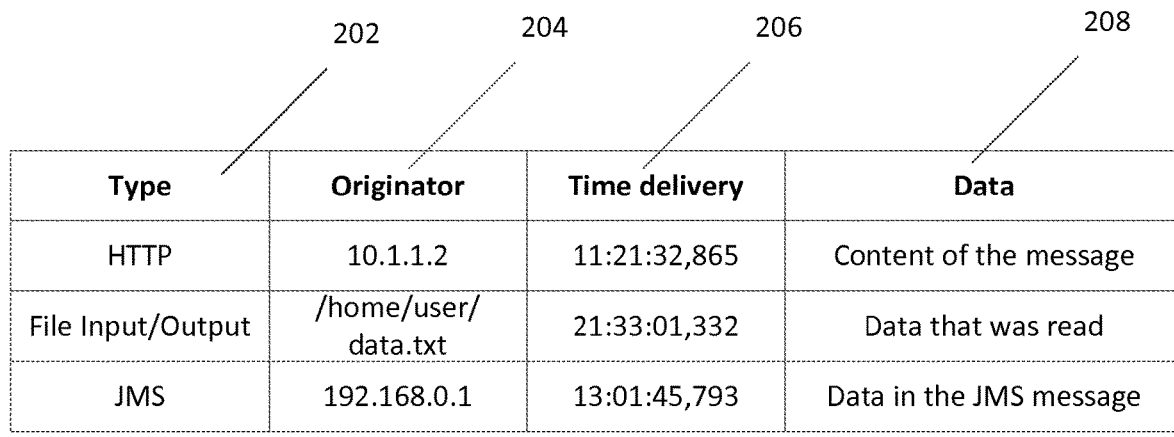
FIG. 2 illustrates example of a table of context input set of a computer system in accordance with some embodiments.

FIG. 2 illustrates an example of a table 200 found in the CIS 110b of an operating system according to embodiments of the disclosure. In one embodiment table 200 is the same as table 120 of CIS 110b described with respect to FIG. 1. As illustrated, table 200 includes columns identifying a type 202, an originator 204, a time delivery 206, and data 208 associated with a message.

In some embodiments, the type 202 represents the type of messages. Some examples of the types 202 may include, but are not limited to, "HTTP", "File Input/Output" and "Java Messaging Service (JMS). Such types of messages include but are not limited to HTTP message, FILE operation, Java database connectivity (JDBC) message, JMS message etc.

In other embodiments, the originator 204 identifies one of a producer or a sender of the message. Examples of the originator 204 may include, but are not limited to, Internet Protocol (IP) addresses (e.g., "192.168.0.1") an IP address (e.g., "10.1.1.2."), and a file directory address (e.g., "/home/user/data.txt"). In one embodiment, the information provided by the originator 204 column refers to an identity of the originator of the message. Such identity includes but is not limited to IP address, path to the file, domain name, computer name, and so on.

In some embodiments, the time delivery 206 represents a time at which the message is received. Some example formats of the time deliveries 206 may include, but are not limited to, "11:21:32,865", "21:33:01,332" and '13:01:45, 793". In one embodiment, the time delivery of the message identified by the time delivery 206 column refers to a time when the IRM module 112 intercepts and/or receives the event/message.

Data 208 column represents the data of the message. Some examples of the data 208 may include, but are not limited to, a content of the message, data that was read, and data in the JMS message. In one embodiment, the data of the message identified by the data 208 refers to actual data contained in the event/message.

Figure 3:
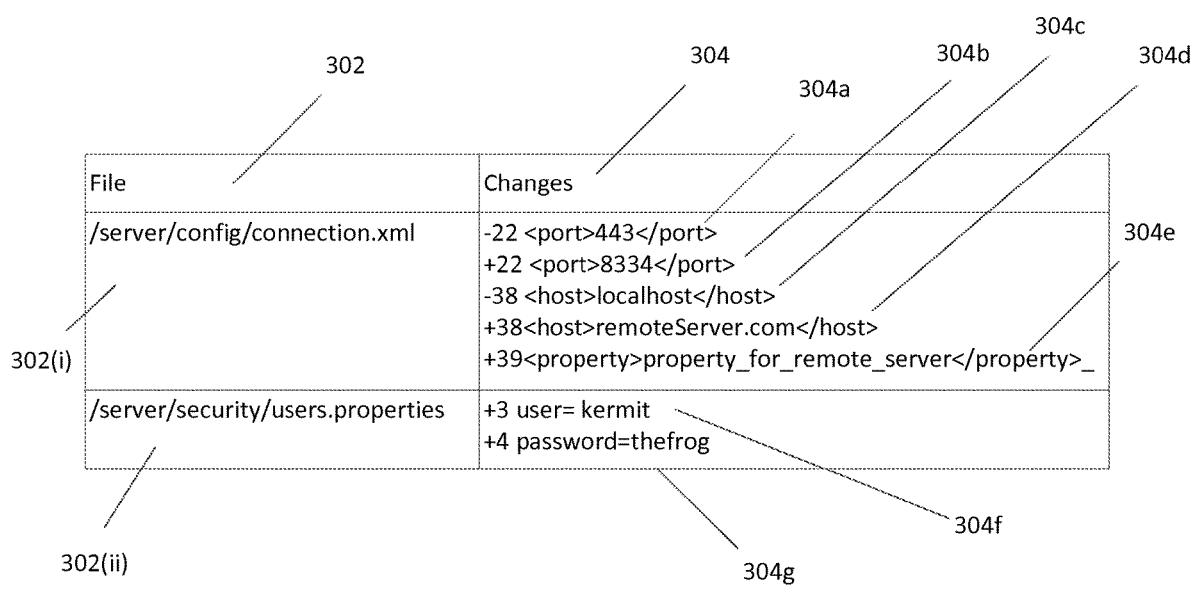
FIG. 3 illustrates example of a table of configuration difference between an operating system and a client device.

FIG. 3 illustrates an example of a table 300 found in the coDiff 114b of OS 104 according to embodiments of the disclosure. In one embodiment, table 300 is the same as the table 130 of Diff 114b described with respect to FIG. 1. As illustrated, table 300 includes columns identifying file 302 and the changes 304 associated with the file 302.

In some embodiments, data stored in the file column 302 represents path to the configuration file. Some examples of the configuration path files 302 include, but are not limited to, "/server/config/connection.xml" as configuration path file 302(i) and "/server/security/users.properties" as configuration path file 302(ii).

In other embodiments, data stored in the changes column 304 represent the changes associated with the configuration files 302. The changes are the difference between the configurations of the application running on the OS 104 and the configuration of the default application. Some examples of the changes 304 associated with the configuration path file 302(i) include, but are not limited to "−22<port>443</port>" as change 404a, "+22<port>8334</port>" as change 304b, "−38<host>localhost</host>" as change 304c, "+38<host>remoteServer.com</host>" as change 304d and "+39<property>property_for_remote_server</property>" as change 304e. As such, for the configuration path file 302(i), the change 304a represents that line 22 be removed and substituted with the change 304b. Similarly, for the configuration path file 302(i), the change 304c represents that line 38 be removed and substituted with the change 304c and further should add a line 39 as indicated by change 304d. Some examples of the changes 304 associated with the configuration path file 302(ii) include, but are not limited to change 304 e, "+3 user=kermit" and change 304f, "+4 password=thefrog". The changes 304e and 304f represent that these two lines be added to the server/security/user.properties.

Figure 4:
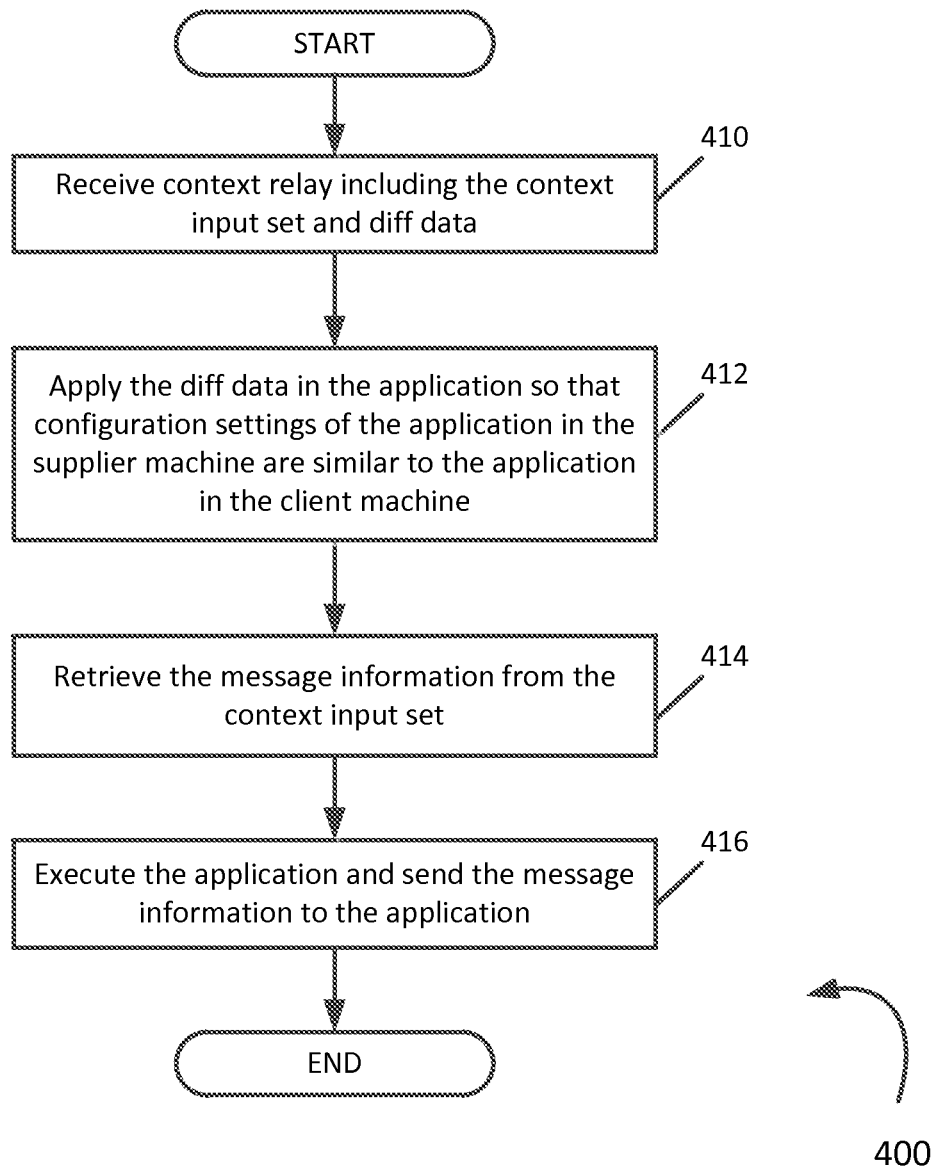
FIG. 4 is a flow diagram of one embodiment of a method for providing context simulation.

FIG. 4 is a flow diagram illustrating a method 400 for providing context simulation. Method 400 may be performed by processing logic that may comprise hardware (e.g., circuitry, dedicated logic, programmable logic, microcode, etc.), software (such as instructions run on a processing device), firmware, or a combination thereof. In one embodiment, method 400 is performed by the IRM module 112b of FIG. 1 executing in a computing device, such as the supplier device 101 of FIG. 1.

Method 400 begins at block 410 where IRM module 112b receives context relay collected by the IRM module 112a in the client machine 100. As discussed above, the context relay is combination of context input set including message information and diff data. As discussed above, the message information includes, but is not limited to, a type of message, an originator of the message, delivery time of the message and data of the message. In one embodiment, a message is any communication generated by the application 102a on the client OS 104a of the client machine 100. In one embodiment, the message is any communication received by the application 102a on the client OS 104a. These messages may include, but are not limited to, file operations, database communication, remote method invocations, java naming and directory interface lookups, http communication, java virtual machine stack, and so on.

As discussed above, the IRM module 112a of the client OS 104 may determine the delivery time of the message in the message information. In one embodiment, the delivery time of the message is a time when the message is generated on the client OS 104a. In one embodiment, the delivery time is a time when the message is received by the client OS 104a.

As discussed above, the diff data may include difference between default configuration of the application (default application configuration) and actual configuration of the application (actual application configuration) that runs on the client OS 104a. A configuration may be a set of characteristics defined to set up or customize a computer program with one or more commands to execute for a particular application. Such characteristics are composed in a configuration file, which may be accessed by a computer program for any updates and/or changes in the configuration file. Some examples of configuration file settings include, but are not limited to, IP addresses, connection ports, security authentication, filenames, and so on.

At block 412, the IRM module 112b applies the diff data of the context relay to the supplier OS 104b so that the configuration settings of the application 102b in supplier OS 104b of the supplier machine 101 are similar to the configuration settings of the application 102a in the client OS 104a of the client machine 100. As such, the applications 102b of the supplier OS 104b may function according to the configuration settings of the applications 102a of the client host 102a. At block 414, the IRM module 112b retrieves the message information from the context input set of the context relay in the CIS 110b.

At block 416, the IRM module 112b executes the application 102b and sends the message information from the CIS 110b to the applications 102b of the supplier machine 101 in the same interval as the applications are being executed in the client machine 100. As such, the IRM module 112b simulates environment of the client machine 100 in real-time at the OS 104b of the supplier machine 101 so that the message information is sent with identical timing as experienced at the client machine 100. As discussed above, real time is such that all events occur in the OS 104b in same intervals as they occurred in the OS 104a of the client machine 100.

In one embodiment, the application includes a bug. A bug is an error or a failure in a computer program or system that produces an incorrect or unexpected result, or causes it to behave in unintended ways. Based on the above-described embodiments of the disclosure, the IRM module 112b of the supplier machine 101 may then simulate the bug in the client machine 100. In one embodiment, the bug is sent to a developer, who is then able to simulate the bug as it occurred at the client machine 100.

Figure 5:
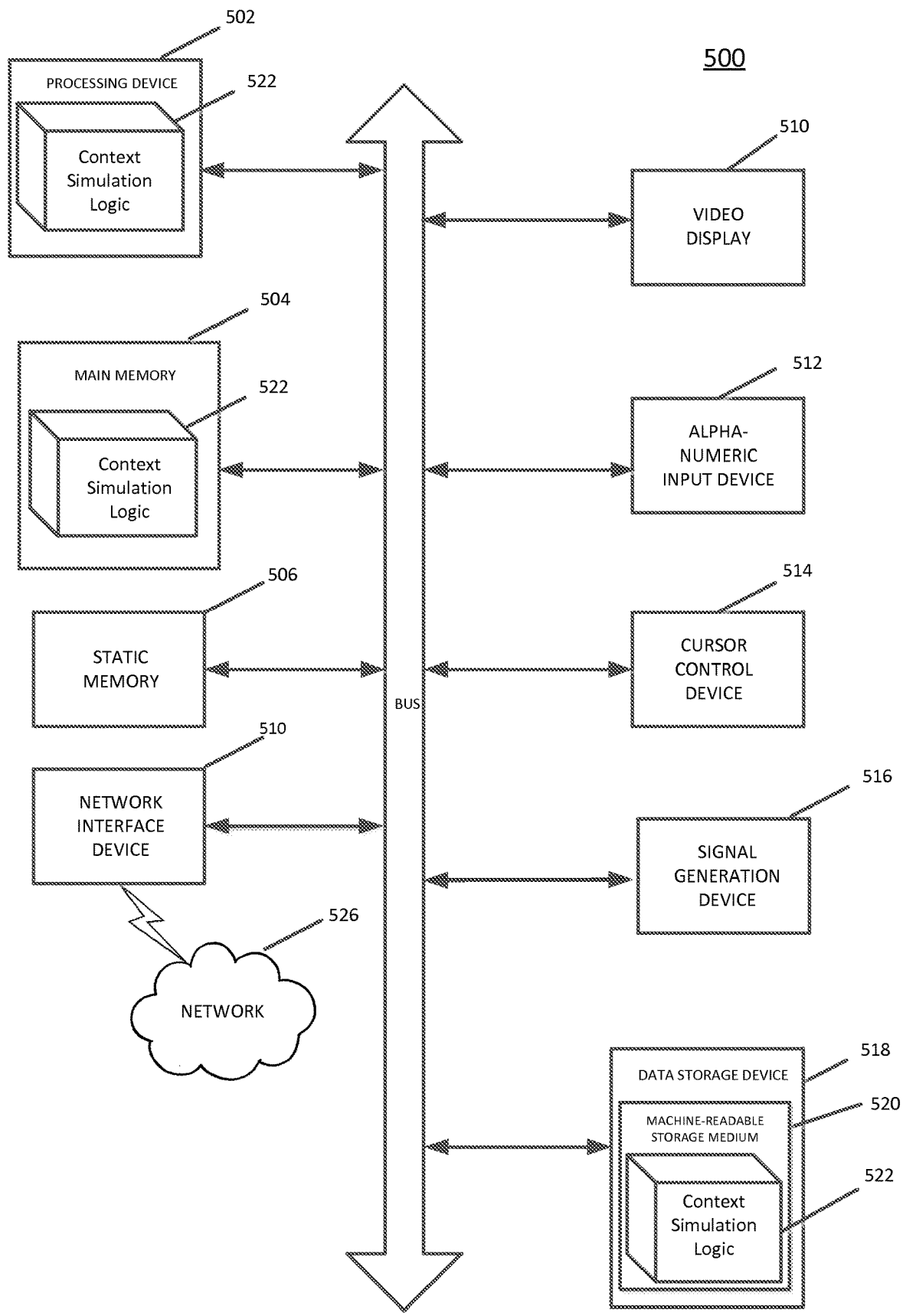
FIG. 5 illustrates a block diagram of one embodiment of a computer system.

FIG. 5 illustrates a diagrammatic representation of a machine in the example form of a computer system 500 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a memory 504 (e.g., read-only memory (ROM), flash memory, dynamic random access memory (DRAM) (such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 530.

Processing device 502 represents one or more general-purpose processing devices such as a microprocessor, central processing unit, or the like. More particularly, the processing device may be complex instruction set computing (CISC) microprocessor, reduced instruction set computer (RISC) microprocessor, long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute context simulation logic 522 for performing the operations and steps discussed herein. In one embodiment, IRM 112b described with respect to FIG. 1 performs the context simulation logic 522.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a machine-accessible storage medium (or more specifically a computer-readable storage medium) 520 on which is stored one or more sets of instructions (e.g. context simulation logic 522) embodying any one or more of the methodologies of functions described herein, such as method 300 for providing context simulation as described with respect to FIG. 3. The context simulation logic 522 may also reside, completely or at least partially, within the memory 506 and/or within the processing device 502 during execution thereof by the computer system 500; the memory 506 and the processing device 502 also constituting machine-accessible storage media.

The machine-readable storage medium 520 may also be used to store the context simulation processing logic 522 persistently containing methods that call the above applications. While the machine-readable storage medium 520 is shown in an example embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the disclosure. The term "machine-accessible storage medium" shall accordingly be taken to include, but not be limited to, solid-state memories, and optical and magnetic media.

In the foregoing description, numerous details are set forth. It should be apparent, however, that the disclosure may be practiced without these specific details. In some instances, structures and devices are shown in block diagram form, rather than in detail, in order to avoid obscuring the disclosure.

Some portions of the detailed descriptions which follow are presented in terms of algorithms and symbolic representations of operations on data bits within a computer memory. These algorithmic descriptions and representations are the means used by those well-known in the data processing arts to most effectively convey the substance of their work to others well-known in the art. An algorithm is here, and generally, conceived to be a self-consistent sequence of steps leading to a desired result. The steps are those requiring physical manipulations of physical quantities. Usually, though not typically, these quantities take the form of electrical or magnetic signals capable of being stored, transferred, combined, compared, and otherwise manipulated. It has proven convenient at times, typically for reasons of common usage, to refer to these signals as bits, values, elements, symbols, characters, terms, numbers, or the like.

It should be borne in mind, however that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "determining", "applying", "reproducing", "retrieving", "replicating", "simulating", 'storing', 'providing', 'using', "displaying" or the like, refer to the action and processes of a computer system, or similar electronic computing device that manipulates and transforms data represented as physical (electronic) quantities within the computer system's registers and memories into other data similarly represented as physical quantities within the computer system memories or registers or other such information storage, transmission or display devices.

The disclosure also relates to an apparatus for performing the operations herein. This apparatus may be constructed for the specific purposes, or it may comprise a general purpose computer selectively activated or reconfigured by a computer program stored in the computer. Such a computer program may be stored in a machine readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct an apparatus to perform the method steps. The structure for a variety of these systems will appear as set forth in the description below. In addition, the disclosure is not described with reference to any particular programming language. It will be appreciated that a variety of programming languages may be used to implement the teachings of the disclosure as described herein.

The disclosure may be provided as a computer program product, or software that may include a machine-readable medium having stored thereon instructions, which may be used to program a computer system (or other electronic devices) to perform a process according to the disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), etc.

It is to be understood that the above description is intended to be illustrative, and not restrictive. Many other embodiments will be apparent to those well-known in the art upon reading and understanding the above description. Although the disclosure has been described with reference to specific examples of embodiments, it will be recognized that the disclosure is not limited to the embodiments described, but can be practiced with modification and alteration within the spirit and scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

What is claimed is:

1. A method comprising:
    receiving, by a processing device of a supplier machine from a client machine, a context input set (CIS) and configuration difference data corresponding to execution of a first application by the client machine;
    applying the configuration difference data to a second application to be executed by the supplier machine, the applying causing configuration settings of the second application to match configuration settings of the first application, wherein the second application is different than the first application;
    retrieving from the CIS, by the processing device, message information comprising message timing data and message content data for the first application executed by the client machine, the message timing data comprising delivery times of first messages by an operating system of the client machine during execution of the first application by the client machine, wherein the first application comprises a bug;
    generating, by the processing device, second messages in view of the message content data;
    determining one or more intervals in view of the delivery times of the first messages;
    sending to the second application, during execution of the second application, the second messages in accordance with the one or more intervals to cause the second application to simulate the execution of the first application; and
    debugging the first application in view of the execution of the second application.

2. The method of claim 1 wherein the message information further comprises message type data.

3. The method of claim 1 wherein the message information further comprises message originator data.

4. The method of claim 1 wherein the first messages comprise at least one of a communication generated by the operating system of the client machine or a communication received by the operating system of the client machine.

5. The method of claim 1 wherein the configuration difference data comprises a difference between a default configuration of the second application and the configuration settings of the first application.

6. A system comprising:
    a memory; and
    a processing device, operatively coupled to the memory, to:
        identify a context input set (CIS) and configuration difference data corresponding to execution of a first application by a client machine;

apply the configuration difference data to a second application to be to cause configuration settings of the second application to match configuration settings of the first application, wherein the second application is different than the first application;

retrieve, from the CIS, message information comprising message content data and message timing data for the first application executed by the client machine, the message timing data comprising delivery times of first messages by an operating system of the client machine during execution of the first application by the client machine, wherein the first application comprises a bug;

generate second messages in view of the message content data;

determine one or more intervals in view of the delivery times of the first messages;

send to the second application, during execution of the second application, the second messages in accordance with the one or more intervals to cause the second application to simulate the execution of the first application; and debug the first application in view of the execution of the second application.

7. The system of claim 6 wherein the message information further comprises message type data.

8. The system of claim 6 wherein the message information further comprises message originator data.

9. The system of claim 6 wherein the first messages comprise at least one of a communication generated by the operating system of the client machine or a communication received by the operating system of the client machine.

10. The system of claim 6 wherein the configuration difference data comprises a difference between a default configuration of the second application and the configuration settings of the first application.

11. A non-transitory machine-readable storage medium including data, when accessed by a processing device of a supplier machine, cause the processing device to:

receive, by the processing device from a client machine, a context input set (CIS) and configuration difference data corresponding to execution of a first application by the client machine;

apply the configuration difference data to a second application to be executed by the supplier machine, the applying causing configuration settings of the second application to match configuration settings of the first application, wherein the second application is different than the first application;

retrieve by the processing device, from the CIS, message information comprising message timing data and message content data for the first application executed by the client machine, the message timing data comprising delivery times of first messages by an operating system of the client machine during execution of the first application by the client machine, wherein the first application comprises a bug;

generate, by the processing device, second messages in view of the message content data;

determine one or more intervals in view of the delivery times of the first messages;

send to the second application, during execution of the second application, the second messages in accordance with the one or more intervals to cause the second application to simulate the execution of the first application; and debug the first application in view of the execution of the second application.

12. The non-transitory machine-readable storage medium of claim 11 wherein the message information further comprises message type data.

13. The non-transitory machine-readable storage medium of claim 11 wherein the message information further comprises message originator data.

14. The non-transitory machine-readable storage medium of claim 11 wherein the first messages comprise at least one of a communication generated by the operating system of the client machine or a communication received by the operating system of the client machine.

* * * * *